US006070408A

United States Patent [19]

Clarke et al.

[11] Patent Number: 6,070,408

[45] Date of Patent: Jun. 6, 2000

[54] HYDRAULIC APPARATUS WITH IMPROVED ACCUMULATOR FOR REDUCED PRESSURE PULSATION AND METHOD OF OPERATING THE SAME

[75] Inventors: John M. Clarke, Chillicothe; Willibald G. Berlinger, Peoria, both of Ill.

[73] Assignee: Caterpillar Inc., Peoria, Ill.

[21] Appl. No.: 08/978,329

[22] Filed: Nov. 25, 1997

[51] Int. Cl.$^{7}$ ...... F16D 31/02

[52] U.S. Cl. ...... 60/415; 60/418

[58] Field of Search ...... 60/415, 418; 417/540

[56] References Cited

U.S. PATENT DOCUMENTS

| | | | |
|---|---|---|---|
| 2,330,739 | 9/1943 | Piron | 60/418 |
| 2,811,929 | 11/1957 | Rupp . | |
| 3,574,999 | 4/1971 | Nectoux | 60/418 |
| 3,851,661 | 12/1974 | Fernandez . | |
| 4,201,734 | 5/1980 | Ohnishi et al. . | |
| 4,245,963 | 1/1981 | Hutchins et al. . | |
| 4,256,438 | 3/1981 | Schillinger . | |
| 4,278,403 | 7/1981 | Shafer | 60/418 |
| 4,430,049 | 2/1984 | Aiba . | |
| 4,652,222 | 3/1987 | Aiba . | |
| 4,734,011 | 3/1988 | Hall, Jr. . | |
| 4,757,960 | 7/1988 | Paris et al. | 60/415 |
| 4,801,245 | 1/1989 | de Haas et al. . | |
| 5,074,193 | 12/1991 | Hundertmark | 60/418 |
| 5,199,856 | 4/1993 | Epstein et al. . | |
| 5,314,315 | 5/1994 | Tcholakov . | |
| 5,492,451 | 2/1996 | Franz et al. . | |

OTHER PUBLICATIONS

Yeaple, F.D., Fluid Power Design Handbook, Marcel Dekker, Inc, 1995, pp. 215–218, TJ 843.Y33 1995.

A Review of Free Piston Engine Concepts, Peter A.J. Achten, Sep. 12, 1994, Milwaukee, Wisconsin.

*Primary Examiner*—F. Daniel Lopez

*Attorney, Agent, or Firm*—Taylor & Aust, P.C.

[57] ABSTRACT

Hydraulic apparatus including hydraulic supply means and an accumulator with an accumulator piston and a means for sensing the accumulator piston position to indicate a load requirement to a control means to selectively actuate the hydraulic supply means to satisfy the hydraulic load requirement and to provide a relatively pressure pulse-free operation by actuating the hydraulic supply means in response to the position and motion of the accumulator piston.

6 Claims, 1 Drawing Sheet

HYDRAULIC APPARATUS WITH IMPROVED ACCUMULATOR FOR REDUCED PRESSURE PULSATION AND METHOD OF OPERATING THE SAME

CROSS REFERENCE TO RELATED APPLICATIONS

This application is based, in part, on the material disclosed in United States provisional patent application Ser. No. 08/032819, filed Dec. 11, 1996.

TECHNICAL FIELD

The present invention relates to hydraulic apparatus and more particularly to hydraulic apparatus including an accumulator for cooperating with a hydraulic pump means to produce a hydraulic supply for providing reduced pressure pulsation at variable flow rates.

BACKGROUND ART

It is well known in the prior art that single-acting reciprocating-type hydraulic pumps produce a hydraulic fluid output having a varying pressure. This pressure variation varies cyclically with the stroke action of the reciprocating piston found in such pumps. For example, during the discharge stroke, the piston is pumping fluid from the pump, causing the maximum pressure to be generated in the hydraulic fluid, while during a return stroke, the pump output pressure tends toward zero as the pump is recharged with a fresh charge of hydraulic fluid to be pumped during the next power stroke of the piston. In most applications, it is impractical to provide a single cylinder hydraulic pump of sufficient capacity to supply all of the hydraulic fluid requirements during a single stroke. On the other hand, it is also impractical to operate a hydraulic system where the pressure is varying between maximum pressure and zero pressure, due to the fact that this would cause undesirably erratic and intermittent operation of the hydraulic apparatus supplied by such a pump.

Therefore, various alternatives have been developed in an attempt to provide necessary flow of hydraulic fluid in a manner which is constant in both volume and pressure. One such approach involves the use of a hydraulic pump apparatus having a plurality of pumping pistons which are cooperatively timed to provide the maximum discharge from each piston at a time differing from the other pistons so as to approximate a reasonably constant flow and pressure output in the hydraulic fluid. However, such multi-cylinder pumps include a substantially greater number of components, increasing both the initial cost and the cost of ongoing maintenance of such pumps, as well as increasing the likelihood that the hydraulic apparatus will suffer downtime due to pump failure.

In order to reduce the number of cylinders required in such pumps to provide a reasonable approximation of constant pressure output and volumetric flow, it has become a common practice to provide an accumulator to dampen the variations in pressure and flow from the pump to the hydraulic load. However, the typical accumulator is simply a container for accommodating volumetric variations resulting from changes in pressure and volumetric flow rate. In such accumulators, the pressure variations and volumetric flow variations are not actively damped, and as a result, such accumulators are often inadequate to provide the desired constant pressure and flow rate. There have been attempts in the prior art to provide active accumulators for hydraulic pump apparatus for the purpose of overcoming this deficiency. For example, accumulators have been provided which include a motor or solenoid means responsive to a controller. However, such accumulators merely respond to the pressure variations developed by the pump during the pumping cycle, and are not adequate to respond to the hydraulic load requirements and provide a continuous discharge of hydraulic fluid at the appropriate pressure and volumetric flow level. Such accumulators cannot accommodate the continuous demand of the hydraulic load for hydraulic fluid even when the hydraulic pump is not providing fluid to the accumulator.

Another attempted solution includes the use of a compensator having a free floating piston operating in response to a gas pressure supply in opposition to the pressure exerted by the hydraulic fluid. While such a compensator provides an improved means for compensating for pressure variations due to the continuous operation of the reciprocating pump, the compensator does not cooperate with the hydraulic pump to ensure that sufficient fluid is available to meet the hydraulic load requirements. This limits the usefulness of such a compensator to situations where the hydraulic load is a known constant, such that the compensated output from the hydraulic pump is sufficient to meet the hydraulic load demand. However, it is well known in the prior art that hydraulic load requirements tend to vary from application to application as well as varying during the use of the hydraulic apparatus in any given application.

Therefore, it is an object of the present invention to provide a reciprocating pump apparatus including an accumulator which will permit the hydraulic apparatus to respond to varying load conditions.

It is another object of the present invention to provide such a hydraulic apparatus as will employ a relatively small number of components.

It is yet another object of the present invention to provide such a hydraulic apparatus as will be relatively inexpensive to manufacture.

It is yet another object of the present invention to provide such a hydraulic apparatus as will provide a constant pressure and volumetric flow output from a single-cylinder hydraulic pump.

It is yet a further object of the present invention to provide such a hydraulic apparatus as will provide a means for controllably varying both the volumetric flow output and the hydraulic pressure output of the hydraulic apparatus while providing a relatively pulse-free fluid flow.

These and other objectives of the present invention will become apparent in the specification and claims that follow.

SUMMARY OF THE INVENTION

The present invention is hydraulic apparatus including an accumulator having a floating piston and a piston position sensing means for indicating the piston position to a controller for controlling operation of a reciprocating-type hydraulic pump means in response to the varying flow rates required of the apparatus at various hydraulic loads.

DESCRIPTION OF THE PREFERRED EMBODIMENT

Figure 1:
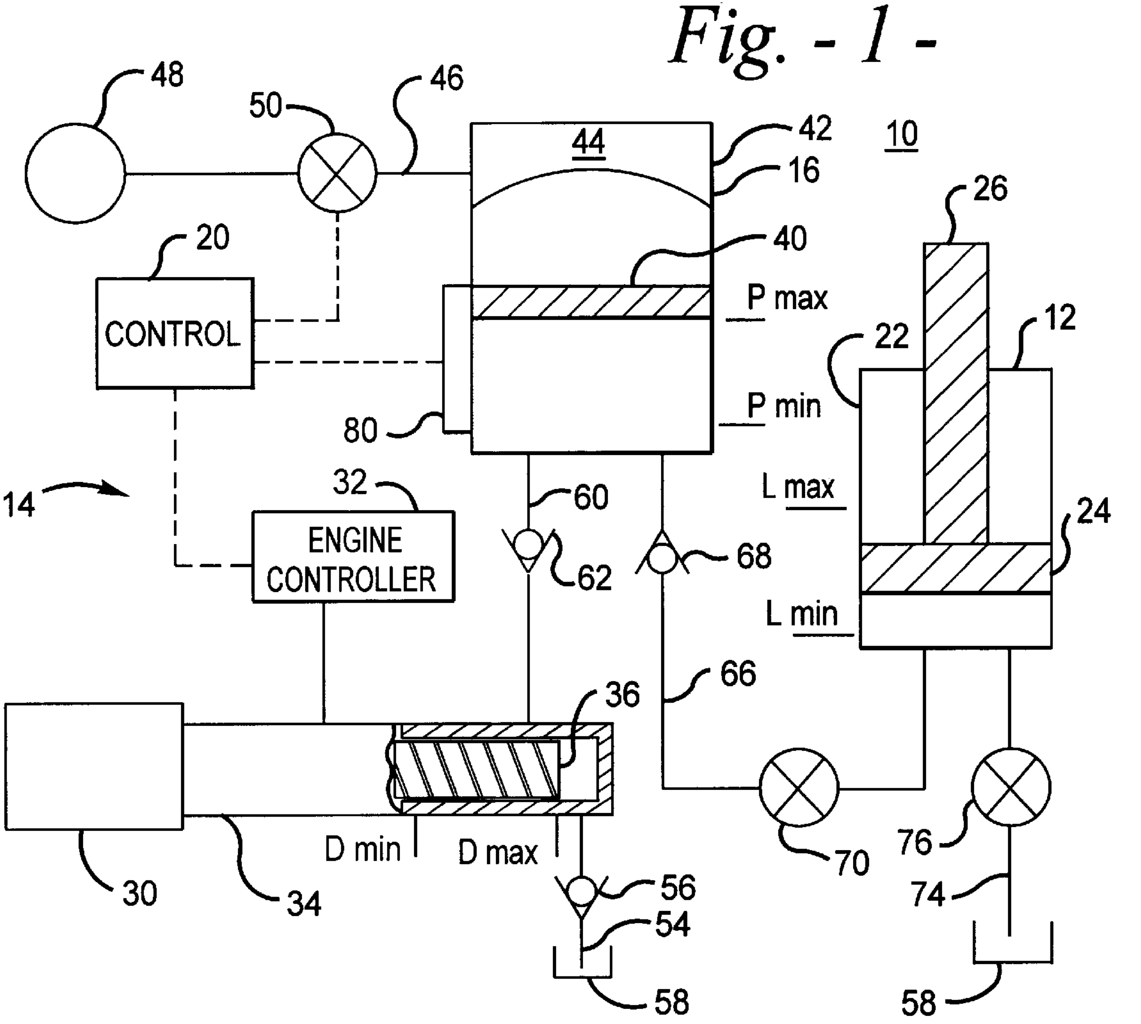
FIG. 1 shows a schematic view of a hydraulic apparatus including the present invention.

A hydraulic apparatus incorporating the present invention is shown in FIG. 1 and generally referred to by the reference number 10. The hydraulic apparatus 10 includes a load actuator 12 operating upon a load (not shown), a supply means 14, an accumulator 16 according to the present invention, and a control means 20. The load actuator 12 includes a cylinder body 22 in which a load piston 24 is operably disposed for linear motion between a minimum point $L_{min}$, and a maximum point $L_{max}$. The load piston 24 is operably connected to a load actuator 26 for transmitting linear motion of the load piston 24 to the load.

The supply means 14 according to the preferred embodiment includes a free piston engine 30 operated in response to an engine controller 32. As shown in partial sectional view, the free piston engine 30 includes a power section 34 in which is disposed a power displacement piston 36 for linear, reciprocating operation between a maximum displacement $D_{max}$ and a minimum displacement $D_{min}$ to define a supply volume.

The accumulator 16 includes an accumulator piston 40 operating linearly within an accumulator body 42 to reciprocate between a maximum displacement $P_{max}$ and a minimum displacement $P_{min}$ therein to define an accumulator volume. The accumulator 16 also includes a gas spring portion 44 which is in flow communication through a gas supply line 46 with a pressurized gas source 48. A gas regulating valve 50 is also disposed in the gas supply line 46 to regulate the pressure of the gas supplied to the gas spring portion 44.

The hydraulic apparatus 10 also includes a plurality of hydraulic lines for flowably connecting the load actuator 12, supply means 14, and the accumulator 16. A first hydraulic line 54 including an intake check valve 56 extends from a hydraulic reservoir 58 to the power section 34 of the free piston engine 30 for permitting fluid flow from the hydraulic reservoir 58 to the power section 34. A second hydraulic line 60 extends from the power section 34 to the accumulator 16, and includes an outlet check valve 62 for permitting a unidirectional flow from the power section 34 to the accumulator 16. A third hydraulic line 66 including an accumulator check valve 68 and a first flow control valve 70 extends from the accumulator 16 to the load actuator 12. A fourth hydraulic line 74 extends from the load actuator 12 to the hydraulic reservoir 58, and includes a second flow control valve 76 for selectively permitting and preventing flow in the fourth hydraulic line 74.

The control means 20 of the hydraulic apparatus 10 is operably connected to a position sensing means 80 disposed on the accumulator 16 for sensing and indicating to the control means 20 the position of the accumulator piston 40 within the accumulator body 42. The control means 20 is also operably connected to the engine controller 32 and preferably to the gas regulating valve 50 for controlling the operation thereof.

Those skilled in the art will understand that the components of the hydraulic apparatus 10 described herein are intended to exemplify a preferred embodiment of the present invention, but not to limit the application thereof. For example, while the supply means 14 is described herein as being a free piston engine 30 operating a power displacement piston 36, a conventional-type single-cylinder reciprocating hydraulic pump could be substituted for the purpose of providing the supply of hydraulic fluid to the accumulator 16 with equally satisfactory results. Similarly, while the preferred embodiment is defined in connection with a single-action load actuator 12, those skilled in the art will recognize that the hydraulic apparatus 10 could readily and easily be modified to operate a double-action load actuator 12, or by way of manifolding, could be employed in the operation of a plurality of load actuators 12. Another example of a readily apparent modification to the preferred embodiment would be the substitution of other pressure means in lieu of the gas spring portion of the accumulator 16 for acting upon the accumulator piston 40. Other components may likewise be substituted or modified without affecting the satisfactory performance of the preferred invention in the hydraulic apparatus 10, and such other and further modifications will be apparent to those skilled in the art.

In normal operation, the accumulator piston 40 is maintained at a position which is not $P_{min}$, but may be $P_{max}$ or between $P_{max}$ and $P_{min}$. To initiate actuation of the load actuator 12, the first control valve 70 is selectively operated to a flow permitting condition, permitting the flow of fluid from the accumulator 16 through the third hydraulic line 66 and to the cylinder body 22 wherein it acts upon the load piston 24 to linearly actuate the load actuator 26. Prior to the flow of fluid from the accumulator 16, the position of the accumulator piston 40 is stationary due to an equilibrium between the pressure of the fluid in the accumulator 16 and the gas pressure provided in the gas spring portion 44, however, the release of fluid from the accumulator 16 causes the accumulator piston 40 to move toward the $P_{min}$ position. The change in position of the accumulator piston 40 is sensed by the position sensing means 80 and transmitted to the control means 20. In response to this change in position of the accumulator piston 40, the control means 20 causes the engine controller 32 to initiate a cycling of the power displacement piston 36 from the $D_{max}$ position to the $D_{min}$ position and again to the $D_{max}$ position.

The cycling of the power displacement piston 36 in the supply means 14 causes fluid to be withdrawn from the hydraulic reservoir 58 through the first hydraulic line 54 and into the power section 34 as the power displacement piston 36 moves to the $D_{min}$ position. As the power displacement 36 moves from the $D_{min}$ position to the $D_{max}$ position, this fluid is then pressurized and forced through the second hydraulic line 60 into the accumulator 16. The pressure of the fluid entering the accumulator 16 causes the accumulator piston 40 to again return toward $P_{max}$ position as the pressurized fluid then displaces the accumulator piston 40 against the pressure of the gas spring portion 44. As the flow of fluid through the third hydraulic line 66 continues, the accumulator piston 40 will again move toward the $P_{min}$ position, and the cycling of the supply means 14 will be repeated by the controller 20 until the load piston 24 reaches its maximum displacement at the position $L_{max}$, or until the first flow control valve 70 is set to the non-flow permitting position such that the flow of fluid through the third hydraulic line 66 is stopped. The load piston 24 may be selectively permitted to return to the minimum displacement position $L_{min}$ by the selective operation of the second flow control valve 76 to the flow permitting condition, to permit the fluid to flow from the load actuator 12 to the hydraulic reservoir 58 through the fourth hydraulic line 74.

Figure 3:
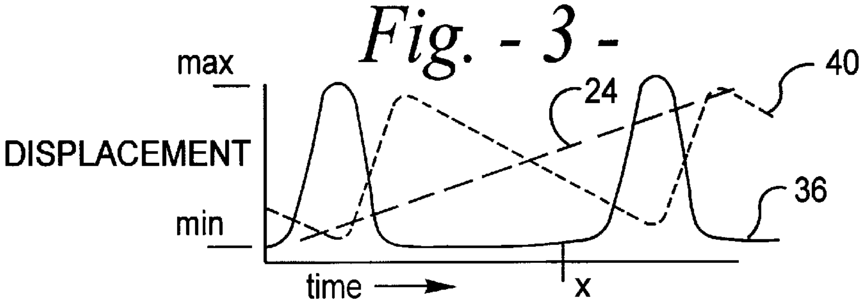
FIG. 3 shows the relative displacement and cycling of the hydraulic apparatus components during a reduced flow operation.
Figure 2:
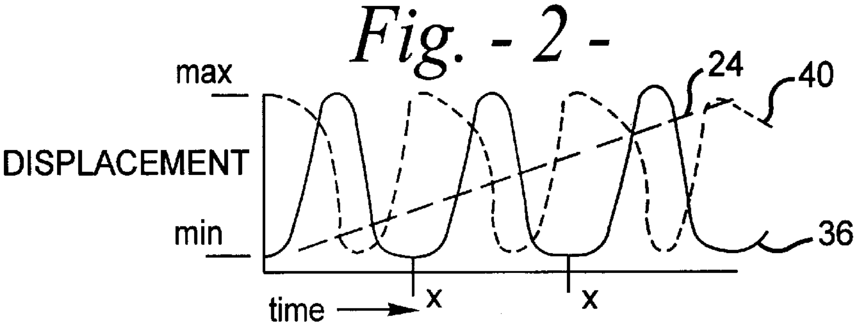
FIG. 2 shows the relative displacement and cycling of the hydraulic apparatus components during maximum flow operation thereof.

FIGS. 2 and 3 illustrate the method of operation of the hydraulic apparatus 10 in two disparate flow requirement conditions. Because the volumetric flow requirements of any given hydraulic apparatus are determined by a number of design criteria, such as the equipment size and application requirements, it will be understood that FIGS. 2 and 3 do not indicate volumetric flow rates. Rather, the FIGS. 2 and 3 indicate the proportional displacement between minimum and maximum displacement positions of each component represented. The curves indicating the relative displacement of the load piston 24, the power displacement piston 36, and the accumulator piston 40, are indicated by their respective reference numbers. The control means 20 initiates a cycling of the supply means at the initial $L_{min}$ position. Each subsequent point in time at which the control means 20 initiates cycling of the supply means 14 is indicated by the "x" on the time line of each FIG. 2 and 3, FIG. 2 illustrates the foregoing operation of the hydraulic apparatus 10 in a maximum flow condition. This Figure illustrates the relative displacements of the power displacement piston 36, the accumulator piston 40, and the load piston 24 during the operation of the load piston 24 from the minimum displacement thereof $L_{min}$ to the maximum displacement thereof $L_{max}$. As the accumulator piston 40 begins to move toward the $P_{min}$ position, the power displacement piston 36 is actuated from the $D_{max}$ to complete one cycle for displacing fluid to the accumulator 16. Upon receiving the fluid from the supply means 14, the accumulator piston 40 is again returned to the $P_{max}$ position. However, the continued withdrawal of fluid from the accumulator 16 through the third hydraulic line 66 again causes the accumulator piston 40 to tend toward the $P_{min}$ position, whereupon the controller 20 again communicates with the engine controller 32 and actuates a cycle of the power displacement piston 36. As this cycling of the power displacement piston 36 and the accumulator piston 40 continues, the piston 24 is acted upon an uninterrupted, pulsation-free flow of fluid so as to permit a smooth and steady operation of the load actuator 12 from the $L_{min}$ position to the $L_{max}$ position. In the maximum flow situation, the cycling of the supply means 14 is repetitive and continuous, being again initiated upon the completion of each previous cycle.

FIG. 3 illustrates the operation of the hydraulic apparatus 10 in a condition of reduced flow, when the first flow control valve 70 is operated to a partial flow condition to permit a reduced volumetric fluid flow through the third hydraulic line 66. As can be seen, the operation of the hydraulic apparatus 10 in the reduced flow condition does not materially differ from that of the maximum flow operation described above. Due to the reduced flow, however, fluid is withdrawn from the accumulator 16 at a reduced rate, with a consequently reduced demand for pressurized fluid from the supply means 14. Since each cycling of the power displacement piston 36 of the supply means 14 produces a fixed quantity of pressurized fluid, the control means 20 requires fewer cycles of the supply means 14. As can be seen in FIG. 3, the power displacement piston 36 is permitted to rest at the $D_{max}$ position between the requisite cyclings thereof, while the accumulator piston 40 moves from the $P_{max}$ position toward the $P_{min}$ position over a relatively longer duration of time than in the maximum flow operation according to FIG. 2. The control means can determine the necessary rate of cycling of the power displacement piston 36 by the rate of movement of the accumulator piston 40 from the maximum displacement $P_{max}$ toward the minimum displacement $P_{min}$, a mathematical operation which is familiar to those skilled in the pertinent art. In the reduced flow condition, however, the supply means 14 is selectively intermittently operated and is permitted to rest at $D_{max}$ during non-operative intervals. Again it can be seen that the load piston 24 of the load actuator 12 moves smoothly and steadily from the $L_{min}$ position toward the $L_{max}$ position although a greater time period may elapse for that transition. The hydraulic apparatus 10 again provides an uninterrupted and pulsation-free flow of fluid from the accumulator 16 to the load actuator 12.

Several advantages of the hydraulic apparatus 10 according to the present invention are readily apparent. One advantage is the ability of the hydraulic apparatus 10 to employ a single-cylinder hydraulic supply means 14 in lieu of a more complex multi-cylinder supply means. Another advantage of the hydraulic apparatus 10 is its relative compactness in employing a relatively small accumulator 16 which is sized to the displacement of the supply means 14 and the load actuator 12. Another advantage of the present invention is apparent in the pulsation-free, smooth operation of the load actuator 12 which enhances the operation of machines and equipment employing such hydraulic apparatus 10 by reducing the wear and tear on the components of such machines and equipment. Yet another advantage of the hydraulic apparatus 10 according to the present invention is the ready adaptability thereof to conditions where maximum flow and less than maximum flow may alternatively be required. A further advantage of the hydraulic apparatus 10 according to the present invention is the ease with which a free-piston engine may be employed for operating a hydraulic apparatus 10 to provide such a hydraulic apparatus 10 which will require reduced maintenance, operating costs, as well as a lower initial cost. Furthermore, the hydraulic apparatus 10 according to the present invention is relatively simple and readily adapted to a wide variety of applications in which such hydraulic apparatus 10 would be desirably employed. These and other advantages of the present invention will be readily apparent to those skilled in the relevant art. Therefore, it can be seen that the present invention presents substantial improvements over the prior art.

Modifications to the preferred embodiment of the subject invention will be apparent to those skilled in the art within the scope of the claims that follow.

What is claimed is:

1. A hydraulic apparatus for actuating a varying hydraulic load between a minimum displacement $L_{min}$ and a maximum displacement $L_{max}$; said hydraulic apparatus comprised of:

a supply means including a reciprocating power displacement piston operating reciprocally between a minimum displacement $D_{min}$ and a maximum displacement $D_{max}$;

an accumulator in communication with said supply means, said accumulator including an accumulator piston operating between a minimum displacement $P_{min}$ and a maximum displacement $P_{max}$, and a piston position sensing means for sensing the position of the accumulator piston, said accumulator further including a gas spring portion with a gas regulating valve; and a control means in communication with said supply means and said piston position sensing means for selectively initiating a cycling of said supply means between said minimum displacement $D_{min}$ and said maximum displacement $D_{max}$ in response to the sensed position of said accumulator piston.

2. The hydraulic apparatus as set forth in claim 1 wherein said gas regulating valve is in communication with said control means whereby said control means selectively regulates gas pressure in the gas spring portion of said accumulator in response to the hydraulic load.

3. A hydraulic apparatus comprised of:

a hydraulic load actuator including a load piston operating between a minimum displacement $L_{min}$ and a maximum displacement $L_{max}$ to comprise a varying hydraulic load;

a supply means including a reciprocating power displacement piston operating cyclically between a minimum displacement $D_{min}$ and a maximum displacement $D_{max}$ to define a supply volume;

an accumulator in communication with each of said hydraulic load accuator and said supply means, said accumulator including an accumulator piston operating between a minimum displacement $P_{min}$ and a maximum displacement $P_{max}$ to define an accumulator volume, said accumulator volume being sized dependent on said supply volume, a piston position sensing means for sensing the position of the accumulator piston, and a gas spring portion for providing a regulated gas pressure in said accumulator, said gas spring portion further including a gas regulating valve; and a control means in communication with said supply means and said piston position sensing means for selectively initiating a cycling of said supply means between said minimum displacement $D_{min}$ and said maximum displacement $D_{max}$ in response to the sensed position of said accumulator piston.

4. The hydraulic apparatus as set forth in claim 3 wherein said gas regulating valve is in communication with said control means whereby said control means can regulate gas pressure in the gas spring portion of said accumulator in response to the hydraulic load.

5. A method of operating a hydraulic apparatus in response to a hydraulic load varying between a maximum flow condition and a reduced flow condition, said method comprised of:

providing a hydraulic load actuator including a load piston operating between a minimum displacement $L_{min}$ and a maximum displacement $L_{max}$;

providing a supply means including a reciprocating power displacement piston operating cyclically between a minimum displacement $D_{min}$ and a maximum displacement $D_{max}$;

providing an accumulator in communication with each of said hydraulic load and said supply means, said accumulator including an accumulator piston operating between a minimum displacement $P_{min}$ and a maximum displacement $P_{max}$;

providing a gas spring portion for providing a regulated gas pressure in said accumulator, said gas spring portion including a gas regulating valve in communication with said control means;

providing in said accumulator a piston position sensing means for sensing the position of the accumulator piston;

providing a control means in communication with said supply means and said piston position sensing means; and selectively initiating a cycling of said supply means between said minimum displacement $D_{min}$ and said maximum displacement $D_{max}$ in response to the sensed position of said accumulator piston.

6. The method of operating a hydraulic apparatus in response to a varying hydraulic load as set forth in claim 5 including the further step of regulating the gas pressure in the gas spring portion of said accumulator by the control means in response to the hydraulic load.

* * * * *